United States Patent [19]

Challis

[11] Patent Number: 5,429,446

[45] Date of Patent: Jul. 4, 1995

[54] APPARATUS FOR HYDRAULICALLY LOCKING A HOLLOW CYLINDER BODY ONTO A SHAFT

[75] Inventor: Brian Challis, Sandy, Utah

[73] Assignee: L. J. Smith, Inc., Bowerston, Ohio

[21] Appl. No.: 103,097

[22] Filed: Aug. 9, 1993

[51] Int. Cl.⁶ .................. F16D 3/80; F16L 17/00; B23B 5/22
[52] U.S. Cl. .................. 403/31; 403/192; 403/193; 403/196; 403/367; 403/377; 279/4.03
[58] Field of Search ............ 403/31, 192, 193, 194, 403/196, 365, 367, 377; 279/2.08, 4.03

[56] References Cited

U.S. PATENT DOCUMENTS

| | | | |
|---|---|---|---|
| 3,378,902 | 4/1968 | Hoexter | 279/4.03 |
| 3,663,027 | 5/1972 | Klipping | 279/4.03 |
| 4,093,052 | 6/1978 | Falk | 279/4.03 |
| 5,141,370 | 8/1992 | Baumann | 279/2.08 |
| 5,237,895 | 8/1993 | Danielsen | 279/2.08 |

FOREIGN PATENT DOCUMENTS

| | | | |
|---|---|---|---|
| 872613 | 9/1946 | France | 279/4.03 |
| 743530 | 12/1943 | Germany | 279/2.08 |
| 2-124203 | 5/1990 | Japan | 279/4.03 |
| 419783 | 3/1967 | Switzerland | 279/4.03 |

*Primary Examiner*—Richard A. Bertsch
*Assistant Examiner*—Howard R. Richman
*Attorney, Agent, or Firm*—Thorpe North & Western

[57] ABSTRACT

An apparatus for selectively and hydraulically locking a hollow cylinder body, such as a lathe cylinder body, onto, and unlocking the cylinder body from, a cylindrical shaft includes a tubular sleeve defining an axially extending passage therein, the sleeve including a centrally located exterior annular channel. The hollow body includes an axially extending cylindrical passage and a single female threaded bore formed to extend radially through the hollow cylinder body to bisect the axial passage thereof. The sleeve is inserted and fixed within the axially extending passage of the body so that the annular channel faces and is closed off by the walls of the axially extending passage to thereby form an annular cavity which is in fluidic communication with the female threaded bore. A cylindrical shaft, such as a lathe spindle or the like, is allowed to pass through the axial passage of the body and thus also through the axial passage of the sleeve so that the sleeve resides within a thin tubular passage between the body and the shaft. A hydraulic pressure fluid is poured into the bore to substantially fill the cavity. A cylindrical piston is screwed into the bore, producing hydraulic pressure which forces the annular channel against the shaft to thereby secure the sleeve, and thus the body, onto the shaft.

3 Claims, 3 Drawing Sheets

APPARATUS FOR HYDRAULICALLY LOCKING A HOLLOW CYLINDER BODY ONTO A SHAFT

BACKGROUND OF THE INVENTION

The present invention relates to a sleeve apparatus for hydraulically locking a hollow cylinder body such as a lathe cylinder body to, and unlocking the cylinder body from, a cylindrical shaft such as a lathe spindle and the like.

A lathe cylinder body includes an axially extending passage through which a lathe spindle passes, allowing the body to circumscribe and releasably lock onto the exterior of the spindle. The lathe cylinder body is configured to hold various lathe tools such as cutting blades, chip limiting segments, and the like.

Prior art methods and apparatus available for locking cutting devices on spindles include, among others, the following two types. One type involves the use of set screws which are threaded radially through the cutting devices to contact the spindle. One problem with this is that the set screws tend to deform the spindle and the cutting device resulting in the cutting device not being properly centered. Furthermore, the set screws are not always set to a consistent degree of tightness from one use to the next, resulting in inconsistent locking forces and deformation between uses.

A second type of locking approach relies upon the use of a relatively large collar disposed within the cutting device hollow and about the lathe spindle. The collar defines an annular hollow which circumscribes the lathe spindle and in which grease is injected by a high-pressure grease gun to provide a type of hydraulic lock. Some disadvantages associated with this approach include (1) the requirement of a high pressure grease gun, (2) the difficulty in preventing or removing air bubbles from the grease, and (3) the difficulty of confining the grease to the annular channel. Moreover, the grease oftentimes squirts about uncontrollably and makes a mess when the pressure is released, and the collar occupies a relatively large area and has strict tolerance requirements.

SUMMARY OF THE INVENTION

It is an object of the present invention to provide apparatus for securely locking a cylinder body to a cylindrical shaft, in a simple and repeatable manner.

It is an additional object of the invention to provide such apparatus capable of use with existing but modified lathe cylinder bodies.

It is another object of the invention to provide such apparatus which is easy to install, use and then remove from installation.

It is a further object of the invention to provide such apparatus capable of establishing a uniform locking force which substantially lessens the likelihood of deformation of the cylindrical shaft, and allows for straightening a deformed shaft.

It is still another object of the invention to provide such apparatus in which substantially the same locking force can be developed from one use to the next.

The above and other objects of the invention are realized in a specific illustrative embodiment of apparatus for hydraulically locking a hollow cylinder body onto a shaft such as a lathe spindle and the like. The hollow body includes a cylindrical inner surface which defines an axially extending passage. The apparatus includes a tubular sleeve defining an axially extending passage therein and having an annular channel formed on the exterior thereof. The sleeve is for inserting into the axially extending passage of the cylinder body so that the annular channel faces and is closed off by the walls of the axial passage. In other words, the annular channel, together with the walls of the passage of the cylinder body, define an annular cavity. The sleeve may then be placed onto a shaft, such as a lathe spindle, so that the sleeve resides within a thin tubular passage between the body and the spindle. A partially threaded bore is formed to extend radially (or other suitable direction) through the cylinder body to communicate with the annular cavity.

In use, a hydraulic pressure fluid such as oil, was or grease is poured into the bore to substantially fill the annular cavity. A cylindrical piston is provided for screwing into the bore. As the piston is screwed into the bore, hydraulic pressure is developed via the hydraulic pressure fluid to circumferentially and uniformly force the bottom wall of the annular channel of the sleeve against the spindle to thereby secure the sleeve, and thus the body, onto the spindle.

BRIEF DESCRIPTION OF THE DRAWINGS

The above and other objects, features and advantages of the invention will become apparent from a consideration of the subsequent detailed description presented in connection with the accompanying drawings in which.

DETAILED DESCRIPTION

Figure 1:
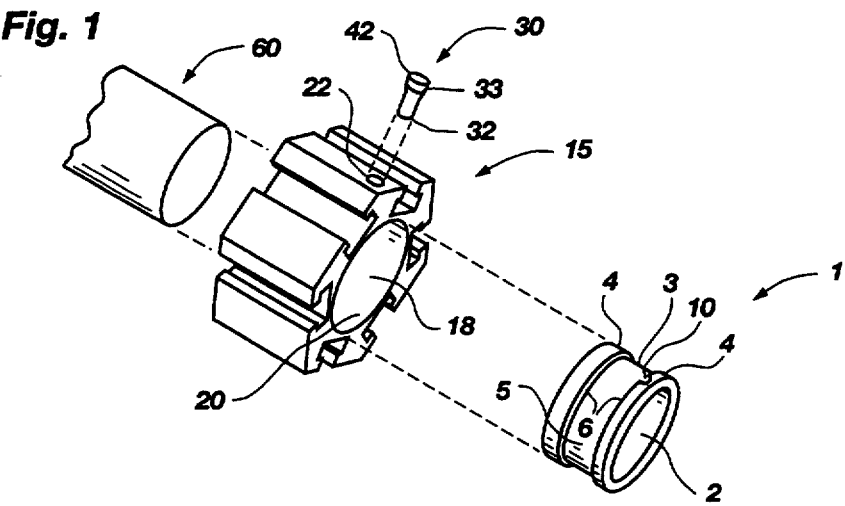
FIG. 1 is a perspective, exploded view of apparatus made in accordance with the principles of the present invention.
Figure 2:
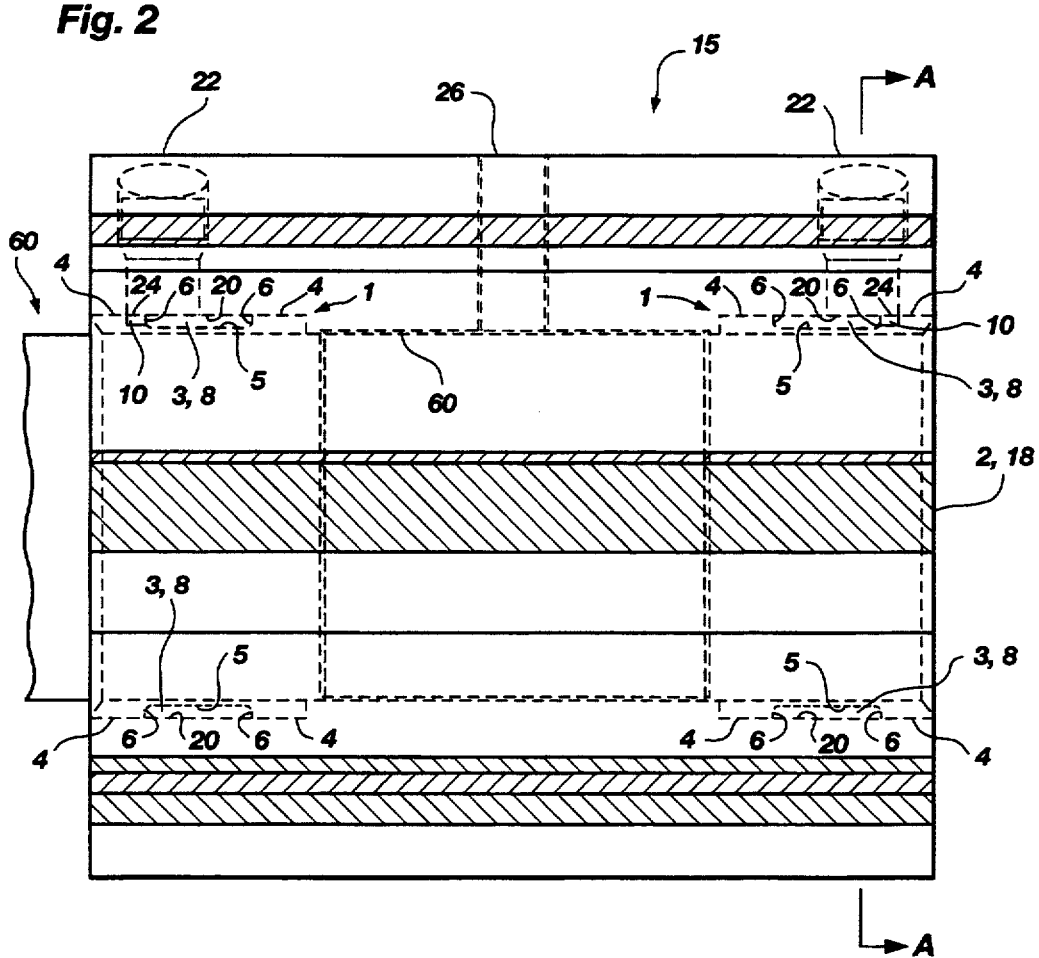
FIG. 2 is a side view of an assembled embodiment of the sleeve apparatus of FIG. 1, with some interior portions shown in phantom.
Figure 3:
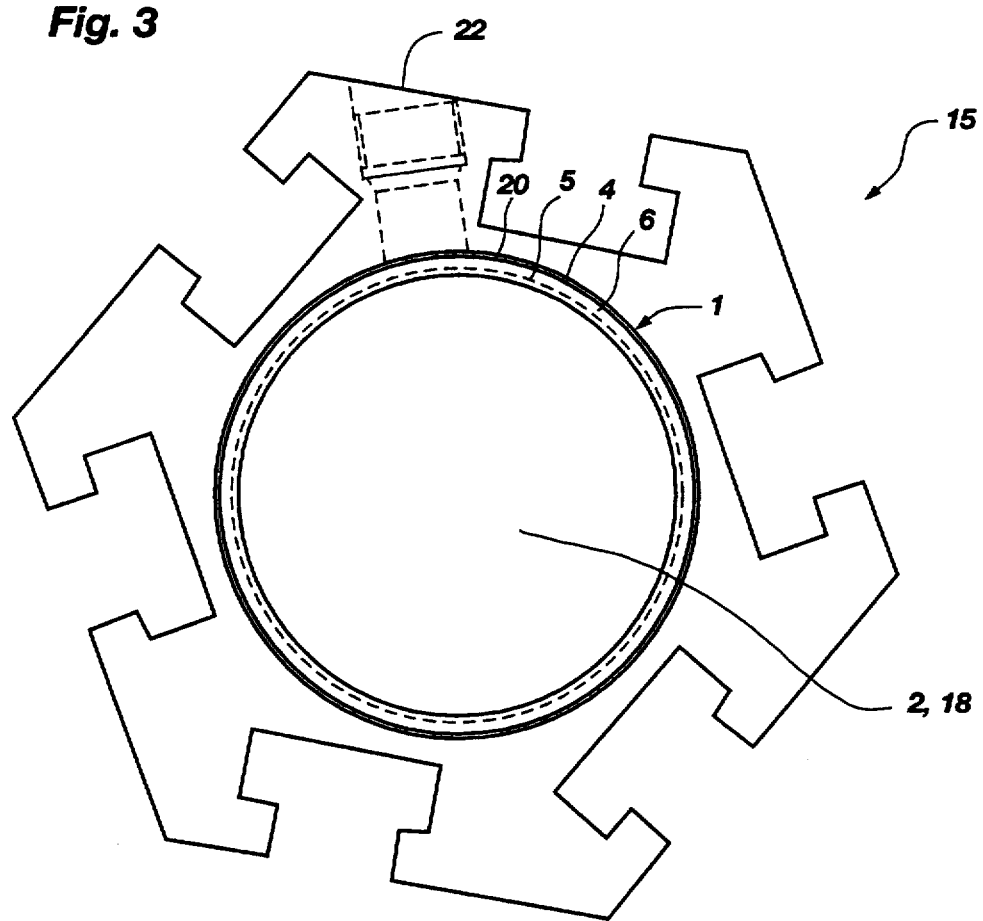
FIG. 3 is an end view of the standard lathe cylinder body of FIG. 2, with some interior portions shown in phantom.
Figure 5:
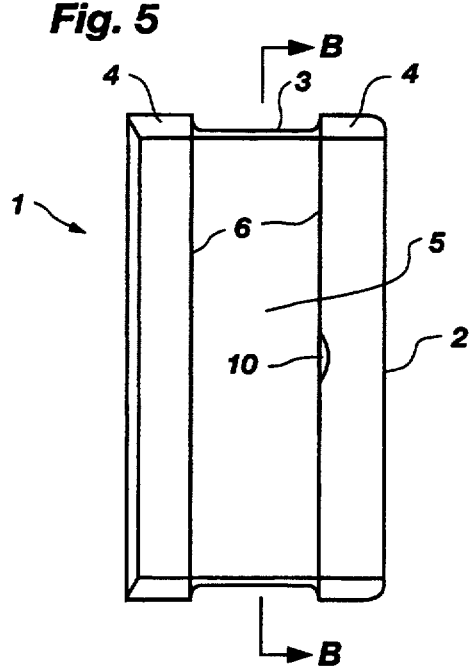
FIG. 5 is a side view of the sleeve of FIGS. 1-4.
Figure 6:
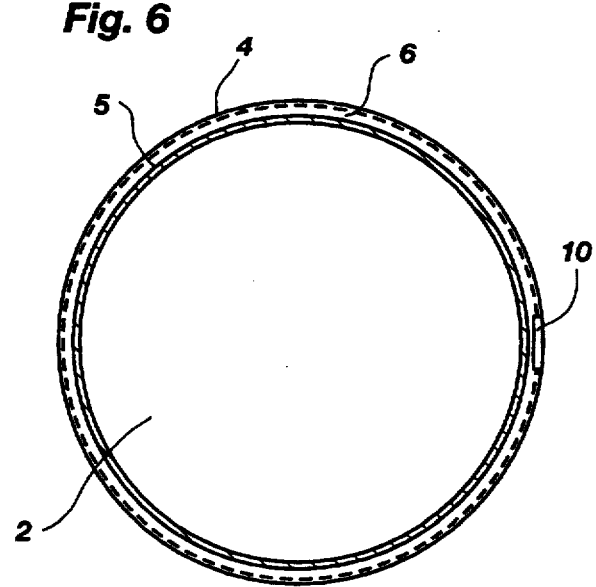
FIG. 6 is a cross-sectional view of the sleeve of FIG. 5, along section B—B.

Referring to FIGS. 1-3, there is shown a standard lathe cylinder body generally designated at 15, which includes an axially extending passage 18 defined by a cylindrical inner surface 20. A tubular sleeve, generally designated at 1 and shown in detail in FIGS. 5 and 6, includes an axially extending passage 2 and a centrally located exterior annular channel 3 which circumscribes the sleeve 1 and defines a thin bottom wall 5. The channel 3 includes two circular channel walls 4, each wall having an interior side 6. One of the interior sides 6 defines a substantially semicylindrical cavity 10 which has an open planar side, meaning that the semicylindrical side of the cavity 10 is bounded by tangible media while the planar side is not. The sleeve 1 is inserted into and fixed within the axial passage 18 of the body such that the channel walls 4 radially abut the inner surface 20 so that the annular channel 3 faces and is closed off by the inner surface 20 form an annular cavity 8.

The standard lathe cylinder body 15 can be modified to include a female partially threaded cylindrical bore 22 extending radially through the cylinder body 15 to intersect the inner surface 20 at a single locus 24 so that when the sleeve 1 is inserted into the axial passage 18 of the body, the bore is placed in fluidic communication with the annular cavity 8 and into alignment with the semicylindrical cavity 10.

Figure 4:
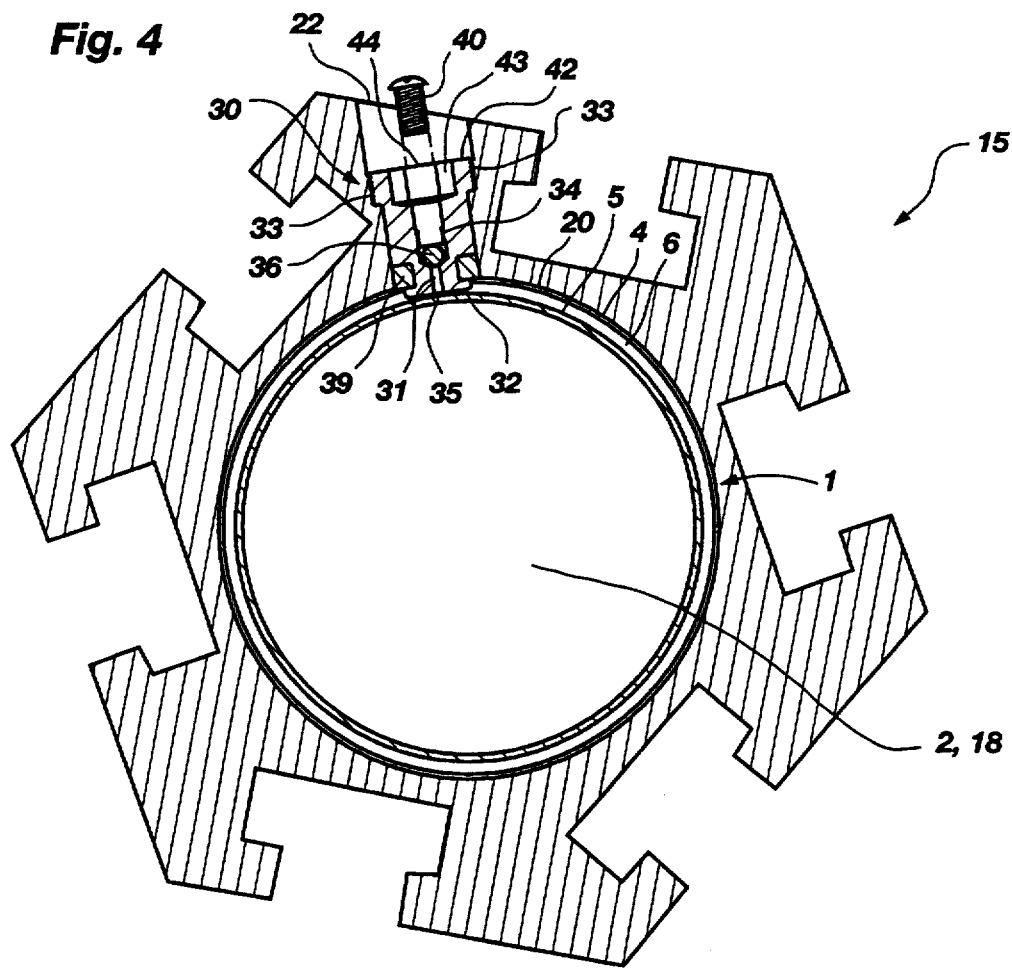
FIG. 4 is a cross-sectional view of the assembled embodiment of the sleeve apparatus of FIG. 2, along section A—A, including a cross-sectional view of the piston of FIG. 1.
Figure 7:
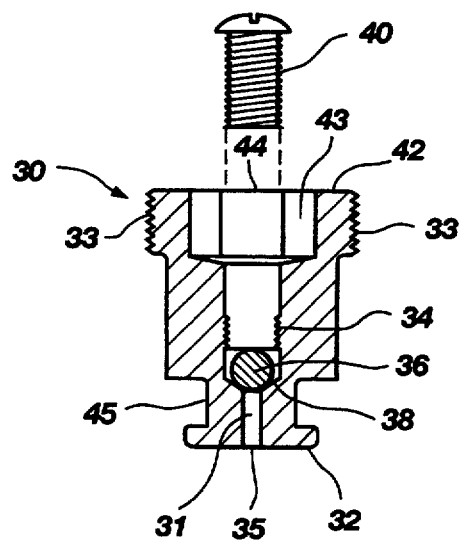
FIG. 7 is a side cross-sectional view of the piston of FIG. 1.
Figure 8:
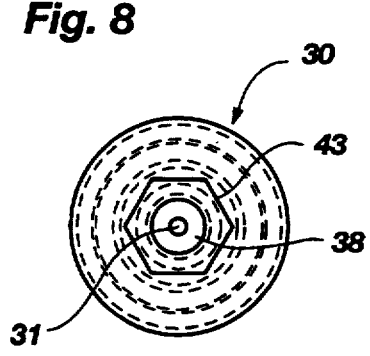
FIG. 8 is an end view of the piston of FIGS. 1, 4 and 7.

FIGS. 7-8 illustrate a tubular piston, generally designated at 30, which can also be cylindrical. The piston 30 defines an axially extending passage 31 therein and includes a first opening 35 located at a first end 32, and an exterior male threaded portion 33 which corresponds to the female threaded bore 22 of the cylindrical body 15 and is located at a second end 42 having a second opening 44. The piston 30 also includes a centrally located female threaded inner portion 34 which corresponds to a male threaded set screw 40, a conical valve seat 38 formed within the axial passage 31 for receiving a valve ball 36, a hexagonal recess 43 located at the second opening 44, and an exterior annular channel 45 located near the first end 32 about which an object such as a resilient gasket 39 (see FIG. 4) or the like can be disposed.

A preferred method of use is as follows. When the sleeve 1 is assembled, a hydraulic pressure fluid such as oil or the like is poured into the bore 22 to at least substantially fill the annular cavity 8. The first end 32 of the piston 30 is placed into the bore 22 and the piston is screwed into the bore to thereby force any air bubbles through the first opening 35. When the pressure fluid begins to pass through the first opening 35, the ball 36 is placed into the second opening 44 and the set screw 40 is screwed into the threads 34 to force the ball against the seat 38 to thereby prevent any additional passage of fluid. When the piston 30 is rotated in one direction, pressure is introduced into the fluid and thus against the bottom wall 5 of the channel 3 to thereby cause the sleeve 1 to radially and uniformly grip the shaft 60, thus securing the cylinder body 15 to the shaft 60. When the piston is rotated in a direction opposite said one direction, said pressure is released from the fluid, and thus from the bottom wall 5 of the channel 3, to thereby release the sleeve 1, and hence the cylinder body 15, from the shaft 60.

It is to be understood that the piston 30 described above can be cylindrical instead of tubular, thus eliminating the steps of forcing the air bubbles from the annular cavity 8 and securing the ball 36 with the set screw 40.

One possessed of ordinary skill in the relevant art will appreciate that more than one sleeve can be used to hydraulically secure a standard lathe cylinder body onto a cylindrical shaft in the manner described above. FIG. 2 teaches two sleeves 1 secured within a single body 15, one sleeve located at each end of the body. It is also within the scope of the present invention to establish a consistent locking force from use to use. One way is to affix a torque wrench capable of measuring or limiting the torque applied to the piston in the recess 43 in order to rotate the piston and thereby introduce pressure into the pressure fluid. This is especially useful because it enables a user to rotate the piston until a torque reading corresponding to a predetermined pressure is achieved. Alternatively, a user may ascertain a mathematical or other relationship between the distance of axial travel of the piston and the corresponding pressure produced within the pressure fluid. In this way a user may rotate the piston until the distance of axial travel of the piston corresponding to a predetermined pressure is achieved. Even if the applied torque is not limited such that more than the necessary torque (to secure the sleeve to the shaft) is applied to the piston, any deformation of the sleeve and shaft resulting from excessive torque will be symmetrical so as not to create an unbalanced condition.

The present invention is a significant advance over the use of set screws to directly attach the lathe cylinder body to the shaft because set screws deform the shaft and cylinder body. Even so, if the shaft used in accordance with the teachings of the present invention were to contain a high point or some other eccentricity or deformation, a user could use a set screw centered in the cylinder body to help reform such a defect. For example, a user could place the body shown in FIG. 2 about a deformed shaft so that a threaded cylindrical bore 26 is centered over a high point on the shaft. A sleeve or sleeves would be used to hydraulically secure the cylinder body onto the shaft in the manner described above, and a set screw could be secured within the bore 26 to help reform the deformation.

It is noted that many of the advantages of the present invention accrue due to the design of the sleeve and the piston. The thinness of the sleeve allows full use of existing lathe cylinder bodies, and further allows conventional lathe cylinder bodies to be retrofit with the invention. The invention thus requires only the slight modifications of existing cylinder bodies described, instead of requiring complete fabrication of new cylinder bodies. Moreover, the capacity of the invention to utilize a hydraulic pressure fluid other than grease provides additional advantages of the present invention, some of which are set forth above. Those skilled in the art will appreciate from the preceding disclosure that the objectives stated above are advantageously achieved by the present invention.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. An apparatus for selectively locking a cylinder body onto a cylindrical shaft, the body having a cylindrical inner surface defining an axially extending passage, the apparatus comprising
   a tubular sleeve for insertion into the axially extending passage of the body, said sleeve including
      an axially extending passage therein for receiving the shaft, and
      an annular channel formed on the exterior of the sleeve to circumscribe the sleeve and define a thin bottom wall for the channel, for holding a hydraulic fluid, said annular channel facing and being closed off by the cylindrical inner surface of the body to define an annular cavity, and
      manually operable locking means formed in the cylinder body
   for selectively locking the sleeve, and thus the cylinder body, onto the shaft by respectively applying a hydraulic pressure uniformly to the bottom wall of the channel to cause the sleeve to grip the shaft, and by releasing said hydraulic pressure from said bottom wall to thereby release said sleeve from said shaft, wherein said locking means includes an at least partially female threaded cylindrical bore which extends radially through the body to intersect the cylindrical inner surface of the body at a single locus and thereby communicate with the annular cavity when the sleeve is inserted into and fixed within the axial passage of the body, and a cylindrical piston having a male threaded exterior portion corresponding to the female threaded bore, for releasably screwing into said bore to produce hydraulic pressure in the annular cavity and cause the sleeve to grip the shaft;

wherein said annular channel includes two circular channel walls having interior sides, said annular channel further comprising a semicylindrical cavity extending radially relative to the sleeve and having a semicylindrical side defined by the interior side of one of said channel walls and an open planar side so that said semicylindrical cavity can be aligned with the female threaded cylindrical bore when the sleeve is inserted into and fixed within the axially extending passage of the body, said semicylindrical cavity for receiving a portion of the piston when said piston is screwed into said female threaded cylindrical bore.

2. An apparatus for selectively locking a cylinder body onto a cylindrical shaft, the body having a cylindrical inner surface defining an axially extending passage, the apparatus comprising a tubular sleeve for insertion into the axially extending passage of the body, said sleeve including an axially extending passage therein for receiving the shaft, and an annular channel formed on the exterior of the sleeve to circumscribe the sleeve and define a thin bottom wall for the channel, for holding a hydraulic fluid, said annular channel facing and being closed off by the cylindrical inner surface of the body to define an annular cavity, and manually operable locking means formed in the cylinder body for selectively locking the sleeve, and thus the cylinder body, onto the shaft by respectively applying a hydraulic pressure uniformly to the bottom wall of the channel to cause the sleeve to grip the shaft, and by releasing said hydraulic pressure from said bottom wall to thereby release said sleeve from said shaft, wherein said locking means includes an at least partially female threaded cylindrical bore which extends radially, through the body to intersect the cylindrical inner surface of the body at a single locus and thereby communicate with the annular cavity when the sleeve is inserted into and fixed within the axial passage of the body, and a cylindrical piston having a male threaded exterior portion corresponding to the female threaded bore, for releasably screwing into said bore to produce hydraulic pressure in the annular cavity and cause the sleeve to grip the shaft;

wherein the piston is tubular, the piston defining an axially extending passage having a female threaded portion and a conical valve seat for receiving a valve ball, the piston further comprising a ball for placement against the seat to thereby block the axial passage of the piston, and a male threaded set screw for selectively screwing into the piston to thereby secure the ball against the seat, or unscrewing from the piston to thereby release the ball from against the seat.

3. A method for selectively locking a cylinder body onto a cylindrical shaft, the body having a cylindrical inner surface defining an axially extending passage, the method comprising the steps of forming an at least partially female threaded cylindrical bore extending radially through the body to intersect the cylindrical inner surface at a single locus, fabricating a tubular sleeve for insertion within the axial passage of the body, the sleeve including an axially extending passage therein for receiving the shaft, and an annular channel formed on the exterior of the sleeve to circumscribe the sleeve and define a thin bottom wall for the channel, for holding a hydraulic fluid, fabricating a cylindrical piston having a male threaded exterior portion corresponding to the female threaded bore, said piston being tubular and further comprising a cylindrical inner surface defining an axially extending passage, female threads formed about a portion of the cylindrical inner surface a conical bearing seat formed within the axial passage of the piston for receiving a ball bearing, a ball bearing for placement against the bearing seat to thereby block the axial passage of the piston, a male threaded set screw for selectively screwing into the piston to thereby secure the ball bearing against the bearing seat, or unscrewing from the piston to thereby release the ball bearing from against the bearing seat, inserting and fixing the tubular sleeve within the axial passage of the body so that said annular channel faces and is closed off by the cylindrical inner surface of the body to define an annular cavity which is in fluidic communication with the bore, inserting the shaft through the axial passage of the body and thus also through the axial passage of the sleeve so that the sleeve resides within a thin tubular passage between the body and the shaft, injecting hydraulic pressure fluid into the bore to at least substantially fill the annular cavity, releasably screwing the piston into the bore to produce hydraulic pressure in the annular cavity and cause the sleeve to grip the shaft;

wherein the step of releasably screwing the piston further comprises the following steps:

screwing the piston into the bore to thereby force any air bubbles through the axially extending passage of the piston until the pressure fluid begins to pass through said axial passage, placing the ball bearing into said axial passage, screwing the set screw into the piston to force the ball bearing against the bearing seat to thereby prevent any additional passage of pressure fluid.

\* \* \* \* \*